US006038956A

United States Patent [19]

Lane

[11] Patent Number: 6,038,956

[45] Date of Patent: Mar. 21, 2000

[54] DYNAMIC PRESSURE REGULATOR CUSHION

[76] Inventor: Norman Lane, 1314 Northside Dr., Ormond Beach, Fla. 32174

[21] Appl. No.: 09/054,163

[22] Filed: Apr. 2, 1998

[51] Int. Cl.[7] .................................................. F16D 31/02

[52] U.S. Cl. .................................................. 91/409; 91/452

[58] Field of Search .................................. 91/28, 29, 394, 91/396, 406, 407, 408, 409, 450, 451, 452; 92/85 B, 143

[56] References Cited

U.S. PATENT DOCUMENTS

| | | | |
|---|---|---|---|
| 1,023,267 | 4/1912 | Mock et al. | 91/407 X |
| 2,431,032 | 11/1947 | Ernst | 91/420 |
| 2,573,943 | 11/1951 | Ziskal | 91/451 X |
| 2,783,742 | 3/1957 | Shafer | 91/407 |
| 3,054,384 | 9/1962 | Darling | 91/26 |
| 3,122,063 | 2/1964 | Chorkey | 91/26 |
| 3,238,850 | 3/1966 | Desmarchelier | 91/394 |
| 3,322,039 | 5/1967 | Madland | 91/405 |
| 3,400,636 | 9/1968 | Schneider | 91/452 |
| 3,412,645 | 11/1968 | Kirk | 91/26 |
| 3,727,518 | 4/1973 | Gooding, Jr. | 91/396 |
| 3,759,142 | 9/1973 | Maytag | 91/396 |
| 3,771,422 | 11/1973 | Kamman | 91/405 |
| 3,885,654 | 5/1975 | Hauswith | 91/406 X |
| 4,006,666 | 2/1977 | Murray . | |
| 4,043,254 | 8/1977 | Jaeger . | |
| 4,064,788 | 12/1977 | Rich et al. | 91/395 |
| 4,210,064 | 7/1980 | Beerens . | |
| 4,292,886 | 10/1981 | Weber . | |
| 4,386,555 | 6/1983 | Horiuchi et al. | 91/395 |
| 4,410,056 | 10/1983 | Pound et al. | 91/450 X |
| 4,700,611 | 10/1987 | Kaneko | 91/405 |
| 4,862,786 | 9/1989 | Boyer et al. | 91/396 X |
| 4,889,036 | 12/1989 | Yoshikawa et al. . | |
| 5,125,325 | 6/1992 | Czukkermann . | |
| 5,159,814 | 11/1992 | Jakobsson . | |
| 5,309,817 | 5/1994 | Sims . | |
| 5,385,218 | 1/1995 | Migliori . | |
| 5,517,898 | 5/1996 | Kim et al. | 91/24 |

FOREIGN PATENT DOCUMENTS

| | | | |
|---|---|---|---|
| 601474 | 4/1978 | Russian Federation | 91/394 |

*Primary Examiner*—John E. Ryznic
*Attorney, Agent, or Firm*—Paul S. Rooy

[57] ABSTRACT

A dynamic pressure regulator cushion for use with a fluid power actuator to smoothly and linearly decelerate the piston at end of stroke. The dynamic pressure regulator cushion comprises a pressure sensor attached to a valve. A side of the pressure sensor tending to close the valve is exposed to driving pressure. A side of the pressure sensor tending to open the valve is exposed to fluid pressure in the cylinder ahead of the piston. An adjustable valve pre-loading is provided to maintain the fluid pressure in the cylinder ahead of the piston at a constant, pre-determined level above the driving pressure during the cushion stroke. This pre-set pressure differential across the piston serves to smoothly and linearly decelerate the piston to near zero at end of stroke. Two pressure sensor embodiments taught are a pressure sensor piston reciprocating within a plenum, and a diaphragm whose outer edge is attached to, and sealed to, an inside wall of a plenum. Means are disclosed to relieve fluid pressure in the cylinder ahead of the piston at end of stroke, so as to allow full actuator holding pressure on the piston at end of stroke.

20 Claims, 7 Drawing Sheets

DYNAMIC PRESSURE REGULATOR CUSHION

BACKGROUND OF THE INVENTION

1. Field of the Invention

This invention relates to fluid power actuators, and in particular to a dynamic pressure regulator cushion for use with a fluid power actuator.

2. Background of the Invention

Fluid power actuators enjoy considerable popularity in a wide variety of industrial applications, especially in automation and numerical control machines. Either pneumatic or hydraulic fluid may be used to power these actuators. A typical power actuator system comprises a cylinder within which a piston is free to reciprocate. A load is attached to the piston. For simplicity, hereafter the piston/load combination will be most often be referred to as the piston. A pressurized fluid supply is alternately connected to either a first cylinder end or a second cylinder end through a directional control valve. The piston is driven away from the cylinder end to which the pressurized fluid supply is connected. A flow control valve is connected to each cylinder end to control the flow rate of fluid escaping from the cylinder ahead of the piston, which in effect controls the piston speed during most of the stroke.

In operation, the directional control valve permits fluid at driving pressure to flow into a first cylinder end, which drives the piston towards an opposite, second cylinder end. The speed at which the piston travels toward the second cylinder end is controlled by the rate at which fluid is allowed to escape from the second cylinder end through the flow valve associated with the second cylinder end.

The piston rate of speed can be considerable. Thus, it is advisable to provide a cushion to slow the piston before it crashes into the cylinder end wall at the second cylinder end. If the piston were allowed to crash uncushioned into a cylinder end wall, the life of the actuator would be reduced, and metal fragments could even result, causing immediate actuator failure. Therefore, one of the most important components in modem fluid power actuators is the cushion which slows the piston down in a controlled fashion at either extreme of its travel.

Existing Designs

Many conventional fluid power actuators provide a cushion sealing mechanism which blocks the path of fluid out of the cylinder to the flow control valve, forcing the fluid instead to exit the cylinder through a cushion cylinder passage and thence through a cushion valve. This flow restriction (also known as the cushion orifice) causes a rapid increase in retarding pressure (a "pressure spike") ahead of the piston, which acts to decelerate the piston. However, conventional cushion valves are simply another static restriction like that of the flow control valves, so the system will merely tend toward a new equilibrium at a reduced, constant piston speed, until the piston strikes the cylinder end.

The relevant system parameters are depicted graphically in FIG. 9. FIG. 9 shows conventional cushion pressure/piston speed vs. stroke graph 100. Values for supply pressure 106, driving pressure 108, fluid pressure ahead of piston 112, and piston speed 118 are read off ordinate axis 102 for different piston positions during the stroke along abscissa axis 104. The piston stroke starts at one end of the cylinder, at stroke start 101. The piston (and load) accelerates to speed within the cylinder (see piston speed 118), as driven by driving pressure 108. Driving pressure 108 must exceed fluid pressure ahead of piston 112 by an amount sufficient to overcome normal operating speed friction 110.

At cushion start 126 the cushion sealing mechanism blocks the path of fluid out of the cylinder to the flow control valve, forcing the fluid instead to exit the cylinder through a cushion cylinder passage and thence through a cushion valve. This restriction causes pressure spike 114, which causes excessive deceleration 120 in piston speed 118. Because conventional cushion valves are simply another static restriction like that of flow control valves, during cushion stroke 115 the system will merely tend toward a new equilibrium at cushion piston speed 122 (which is less than driving pressure 108 due to cushion stroke friction 116), until the piston strikes the cylinder end at high impact speed 124. The piston stroke ends with the high impact speed 124 collision between the piston and the cylinder end, at stroke end 103.

In order to reduce final high impact speed 124 to an acceptable level, the cushion orifice may be adjusted to a very small opening. This results in an very hard air spring which may cause the piston (and load) to oscillate initially, then travel very slowly over the final portion of the cushion stroke. Neither of these piston/load behaviors is desirable.

One improvement over conventional fluid power actuator cushions is the incorporation of a stepped or tapered cushion sealing mechanism which progressively reduces orifice area throughout cushion stroke for the purpose of maintaining constant cushion pressure as piston speed drops. There are a number of problems associated with this solution. Those cushion sealing mechanisms which do not incorporate seals to separate the stages must rely on very closely held dimensions, which renders them time-consuming to manufacture, and therefore expensive. The cushion sealing mechanism designs which incorporate separate seals for each stage are bulky, and limited in the number of stages they can provide. Designs which incorporate multiple orifices but single seals require that the orifice pass over the seal, risking damage to the seal (see U.S. Pat. No. 5,125,325, granted to Czukkermann). Finally, adjustment for differing loads is difficult.

Especially in air and/or small actuators, the total metering area must be very small to be effective. When distributed over multiple orifices, each one must be extremely small, and thus such cushions are difficult and costly to make, and subject to blockage by contamination. Adjustment for differing loads is difficult with these designs.

U.S. Pat. No. 4,700,611 was granted Kaneko for a complex cushion which required a large piston, multiple seals, and two different valves per cushion. This design suffered from a number of problems. The complex cushions added considerably to the axial dimension of the actuator. Because of its complexity and the number of components, it was costly to make. In addition, the pressure relieving valve controlling the pressure within the cushion had to be set relative to atmospheric pressure, which required a relatively large spring force, which in turn required a relatively large spring. A large spring translates into expense and decreased adjustment sensitivity. Also, the cushioning force of this device was dependent on the pressure applied to the actuator piston when it moved in the opposite direction. A change in line pressure during the time between the charging and cushioning strokes would result in a disproportionate cushioning force.

Another problem associated with the '611 cushion was that its cushioning relied on storage of fluid pressure over the period of time a stroke took place. A small leak could render the cushion ineffective. Still another problem was the requirement for a leak path (drawing item 68) to relieve the pressure remaining in the cushion to allow full holding force at the end of the stroke. If lubricated air were used, this leak path would actually be a constant oil leak to atmosphere. Also, this path remained open during the first part of the power stroke. If for some external reason the piston motion were to be stopped during this first part of the power stroke, the loss of pressurized air through leak path 68 would be continuous.

Finally, this design required a vent to atmosphere in order to function. This vent had to be filtered to prevent contamination, which may require additional plumbing. Also, the vent would exhaust pressurized air to atmosphere, same as leak path 68.

SUMMARY OF THE INVENTION

Accordingly, it is an object of the present invention to provide a dynamic pressure regulator cushion which provides a constant retarding pressure throughout the cushion stroke. Design features allowing this object to be accomplished include a cushion cylinder passage communicating with a spear cavity through a cushion regulator valve communicating with fluid under driving pressure through a cushion driving pressure passage. Advantages associated with the accomplishment of this object include a constant rate of piston (and load) deceleration resulting in low end-of-stroke piston impact speed.

It is another object of the present invention to provide a dynamic pressure regulator cushion which may be easily adjusted for a variety of loads. Design features allowing this object to be accomplished include a cushion cylinder passage communicating with a spear cavity through a cushion regulator valve communicating with fluid under driving pressure through a cushion driving pressure passage, the cushion regulator valve incorporating a screw and spring. A benefit associated with the accomplishment of this object is the capability of using one dynamic pressure regulator cushion design for a multitude of applications, varying only the cushion regulator valve adjustment.

It is still another object of this invention to provide a dynamic pressure regulator cushion which is simple in design, and compact in size. Design features enabling the accomplishment of this object include a single cushion regulator valve per cushion, and single cushion driving pressure and cushion cylinder passages. Advantages associated with the realization of this object include reduced complexity of construction, reduced size, reduced materials required for construction, and the associated cost savings.

It is another object of the present invention to provide a dynamic pressure regulator cushion which uses driving pressure fluid as a reference, not atmospheric pressure. Design features allowing this object to be accomplished include a cushion cylinder passage communicating with a spear cavity through a cushion regulator valve which communicates with fluid under driving pressure through a cushion driving pressure passage. Benefits associated with the accomplishment of this object include being able to use a smaller spring, with associated cost savings, and being able to accomplish more sensitive adjustment than would be possible with a larger spring.

It is still another object of this invention to provide a dynamic pressure regulator cushion which does not rely on stored pressure to perform its function. Design features enabling the accomplishment of this object include a cushion regulator valve which compares real time driving pressure and real time fluid pressure ahead of the piston to operate. An advantage associated with the realization of this object is increased cushion reliability because the instant invention will not be affected by driving pressure change from stroke to stroke, nor will the instant invention be affected by small leaks.

BRIEF DESCRIPTION OF THE DRAWINGS

The invention, together with the other objects, features, aspects and advantages thereof will be more clearly understood from the following in conjunction with the accompanying drawings.

Seven sheets of drawings are provided. Sheet one contains FIGS. 1 and 2. Sheet two contains FIGS. 3 and 4.Sheet three contains FIGS. 5 and 6. Sheet four contains FIGS. 7 and 8. Sheet five contains FIGS. 9 and 10. Sheet six contains FIGS. 11 and 12. Sheet seven contains FIG. 13.

DETAILED DESCRIPTION OF THE PREFERRED EMBODIMENT

Figure 1:
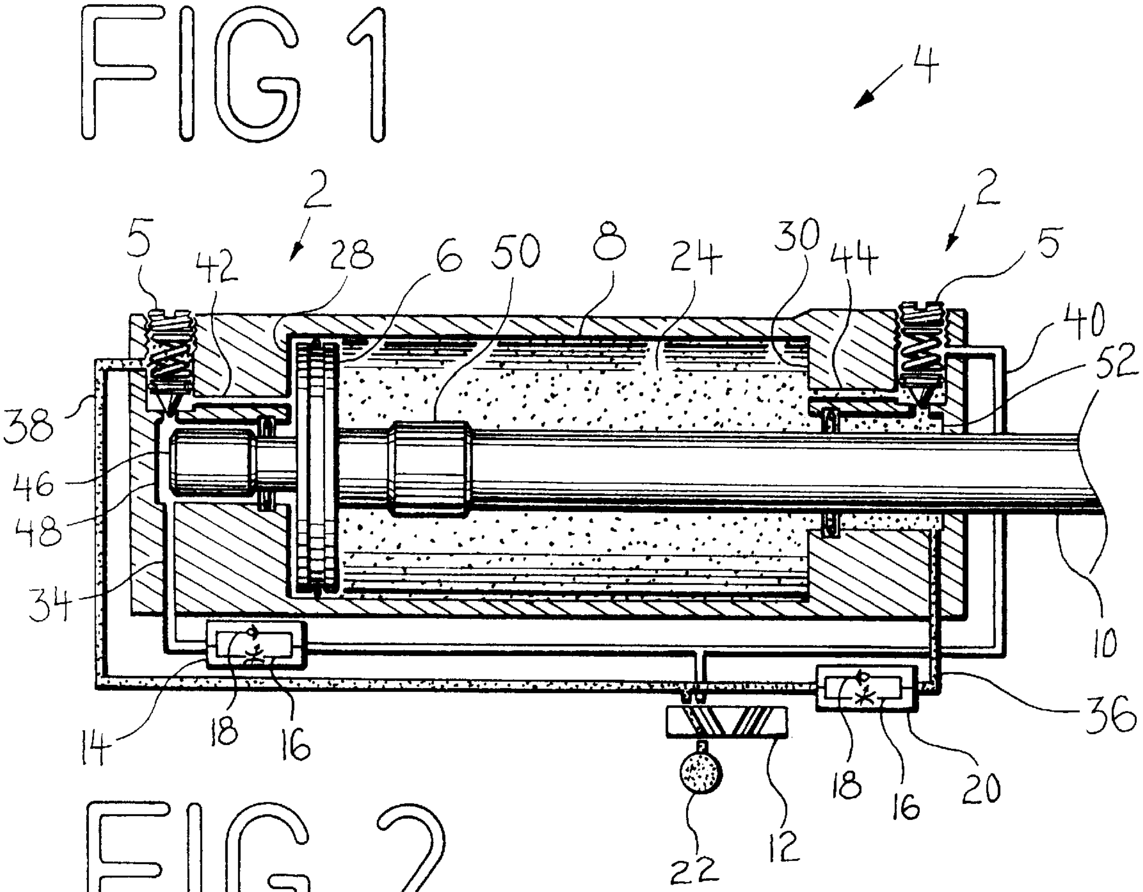
FIG. 1 is a side cross-sectional view of a fluid power actuator having a dynamic pressure regulator cushion at each cylinder end, with the piston against the first cylinder end.

FIG. 1 is a side cross-sectional view of fluid power actuator 4 having a dynamic pressure regulator cushion 2 at each end of cylinder 8,with piston 6 against first cylinder end 28. Fluid power actuator 4 comprises piston 6 attached to output shaft 10, and pressure supply 22 which provides fluid at driving pressure 24 (indicated by dotting) to drive piston 6. Piston 6 reciprocates within cylinder 8.

First spear 46 and second spear 50 are attached to piston 6. First spear cavity 48 is disposed at first cylinder end 28, and communicates with cylinder 8. Second spear cavity 52 is disposed at second cylinder end 30, and communicates with cylinder 8. First spear cavity 48 is sized to mate with first spear 46; second spear cavity 52 is sized to mate with second spear 50. Seals 3 are O-ring seals, pressure-energized one-way seals, other one-way seals, or other seals known in the art, and are used in conventional fashion throughout fluid power actuator 4 and dynamic pressure regulator cushion 2. For example, it is well known in the art that the seals 3 disposed within spear cavities 48 and 52 are generally one-way seals, which seal when a spear is entering its spear cavity, and unseal to allow the spear to exit its cavity.

Figure 2:
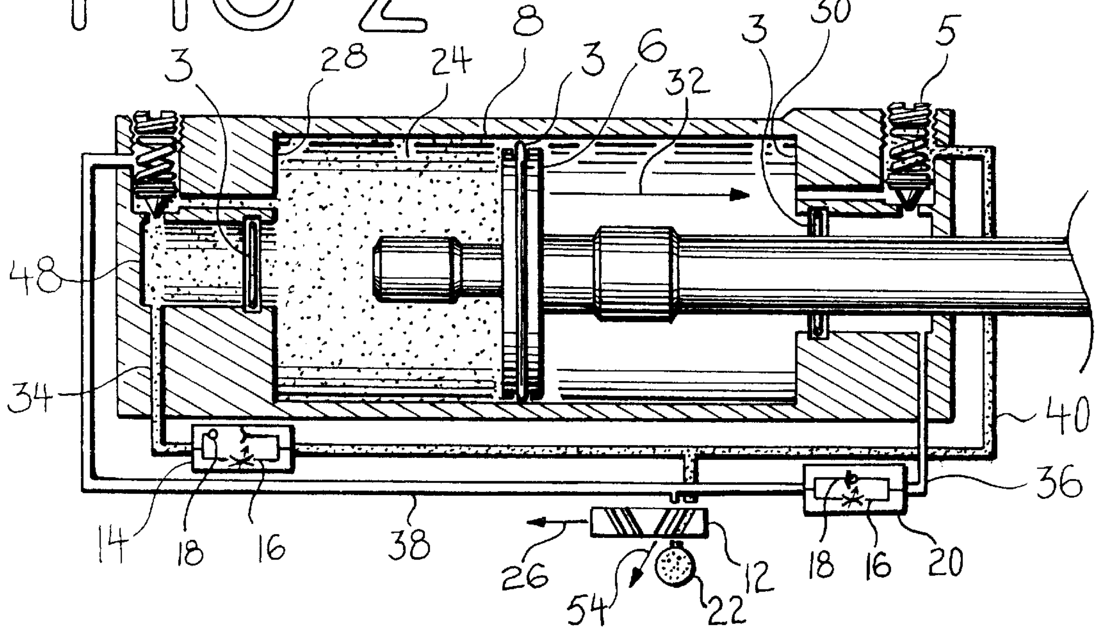
FIG. 2 is a side cross-sectional view of a fluid power actuator having a dynamic pressure regulator cushion at each cylinder end, with the piston at midstroke travelling from the first cylinder end towards the second cylinder end.

As is depicted in FIG. 2, pressure supply 22 communicates with first cylinder end 28 through directional control valve 12, second cushion driving pressure passage 40, first flow control valve 14, first cylinder passage 34, and first spear cavity 48. As is shown in FIG. 1, pressure supply 22 communicates with second cylinder end 30 through directional control valve 12, first cushion driving pressure passage 38, second flow control valve 20, second cylinder passage 36, and second spear cavity 52. Directional control valve 12 directs fluid at driving pressure 24 (indicated by dotting) to either first cylinder end 28, or in the alternative, to second cylinder end 30.

Pressure supply 22 communicates with a cushion regulator valve 5 at first cylinder end 28 through directional control valve 12 and first cushion driving pressure passage 38. Pressure supply 22 communicates with a cushion regulator valve 5 at second cylinder end 30 through directional control valve 12 and second cushion driving pressure passage 40. When directional control valve 12 directs fluid at driving pressure 24 to first cylinder end 28, fluid at driving pressure 24 is simultaneously directed to the cushion regulator valve 5 at second cylinder end 30 through second cushion driving pressure passage 40. When directional control valve 12 directs fluid at driving pressure 24 to second cylinder end 30, fluid at driving pressure 24 is simultaneously directed to the cushion regulator valve 5 at first cylinder end 28 through first cushion driving pressure passage 38.

First flow control valve 14 and second flow control valve 20 are each comprised of a metering valve 16 and a check (one-way) valve 18.The check valves 18 serve to afford free passage of fluid at driving pressure 24 into first cylinder end 28 or second cylinder end 30 as appropriate, in order to drive piston 6. The metering valves 16 serve to regulate the fluid in front of piston 6 exiting cylinder 8, in order to set the stroke speed of piston 6.

Figure 6:
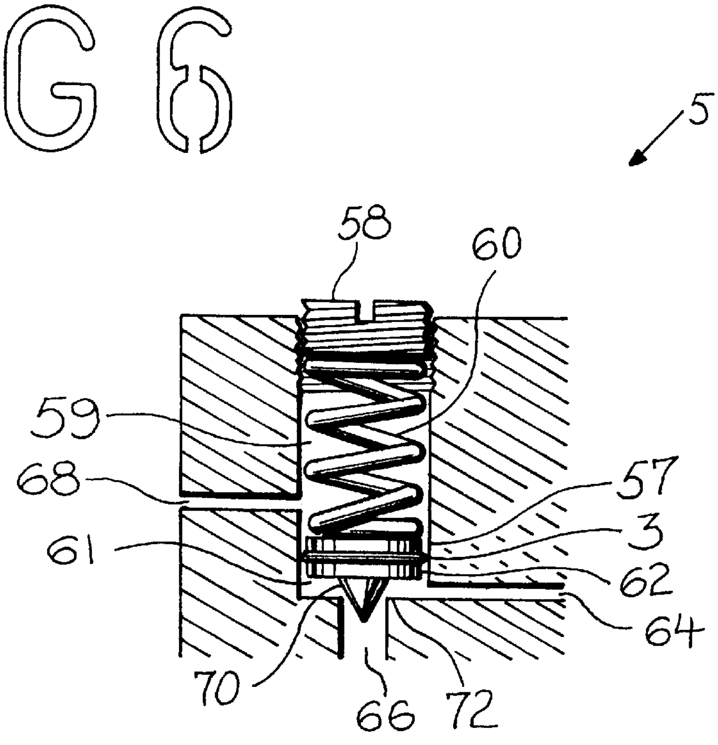
FIG. 6 is a cross-sectional view of a cushion regulator valve.

FIG. 6 is a cross-sectional view of cushion regulator valve 5. Cushion regulator valve 5 comprises plenum 57 containing spring 60 and pressure sensor 62. The area of the upper surface of pressure sensor 62 may be equal to the area of the lower surface of pressure 68 sensor 62. Plenum 57 is bounded at one end by screw 58, and at the other by valve seat 72. The differential pressure at which cushion regulator valve 5 opens is adjusted by turning screw 58: Tightening screw 58 increases the force spring 60 exerts on pressure sensor 62 tending to close valve 70; loosening screw 58 reduces the force tending to close valve 70 which spring 60 exerts on pressure sensor 62 and valve 70. As depicted in FIG. 6, pressure sensor 62 is a pressure sensor piston sealed by O-ring seal 3 reciprocating within plenum 57.

Plenum 57 is divided into upper plenum 59 and lower plenum 61 by pressure sensor 62. Thus, upper plenum 59 is bounded at one end by screw 58, and at the opposite end by pressure sensor 62. Lower plenum 61 is bounded at one end by pressure sensor 62 and at the opposite end by valve seat 72. Valve 70 is attached to, and actuated by, pressure sensor 62.

Fluid at driving pressure 24 enters upper plenum 59 through cushion driving pressure passage 68, which impinges on the upper surface of pressure sensor 62, and tends to close valve 70. Cylinder 8 communicates with lower plenum 61 through cushion cylinder passage 64. Fluid entering lower plenum 61 through cushion cylinder passage 64 impinges on the lower surface of pressure sensor 62, which tends to open valve 70. The spear cavity associated with the dynamic pressure regulator cushion 2 containing cushion regulator valve 5 communicates with lower plenum 61 through cushion spear passage 66. Thus, cylinder 8 communicates with a spear cavity (and then vents through a flow control valve) through cushion regulator valve 5.

Cushion regulator valve 5 compares the force on pressure sensor 62 due to pressure within cylinder 8 ahead of piston 6, with the force on pressure sensor 62 due to fluid at driving pressure 24 and spring 60, and opens when the force on pressure sensor 62 due to pressure within cylinder 8 ahead of piston 6 exceeds the force on pressure sensor 62 due to fluid at driving pressure 24 and spring 60. When cushion regulator valve 5 opens, cylinder 8 communicates with a spear cavity, and then vents through a flow control valve.

Note that the flow restriction produced by dynamic pressure regulator cushion 2 is variable during the cushion stroke, automatically moving to keep the retarding pressure at an adjustable, predetermined level above the driving pressure. This creates a constant retarding force resulting in constant deceleration of the piston to near zero speed at end-of-stroke.

FIGS. 1–5 depict a full stroke of piston 6 from first cylinder end 28 to second cylinder end 30, and the manner in which the instant invention dynamic pressure regulator cushion 2 decelerates piston 6 during the cushion part of the stroke. Throughout the following stroke description, reference may also be made to detail FIG. 6.

FIG. 1 depicts piston 6 at rest against first cylinder end 28, held there by fluid at driving pressure 24 communicating with cylinder 8 through first cushion driving pressure passage 38, second flow control valve 20, second cylinder passage 36, and second spear cavity 52. During the steady state depicted in FIG. 1, both cushion regulator valves 5 are closed and both check valves 18 are closed. Directional control valve 12 is in a position so as to direct fluid at driving pressure 24 into first cushion driving pressure passage 38, and to exhaust second cushion driving pressure passage 40.

The stroke commences by moving directional control valve 12 as indicated by arrow 26 in FIG. 2 so as to direct fluid at driving pressure 24 into second cushion driving pressure passage 40, and to vent first cushion driving pressure passage 38 as depicted by arrow 54. The check valve 18 within first flow control valve 14 opens against the light spring pressure which holds it closed, allowing fluid at driving pressure 24 through first cylinder passage 34 and first spear cavity 48 into cylinder 8. The check valve 18 within second flow control valve 20 remains closed, urged thus by the pressure of fluid ahead of piston 6 escaping cylinder 8 through second cylinder passage 36, and by its light spring pre-loading. The metering valve 16 within second flow control valve 20 regulates the rate at which fluid ahead of piston 6 escaping cylinder 8 through second cylinder passage 36 is allowed to vent through directional control valve 12. Thus, during most of the stroke depicted in FIGS. 1–5, the speed of piston 6 is determined by the metering valve 16 within second flow control valve 20.

FIG. 2 depicts piston 6 at mid travel between first cylinder end 28 and second cylinder end 30, as indicated by arrow 32.

At this point, the forces on piston 6 due to fluid at driving pressure 24, opposed by pressure developed by second flow control valve 20 plus friction have reached equilibrium, so piston 6 has ceased accelerating, and is travelling at constant speed.

Figure 3:
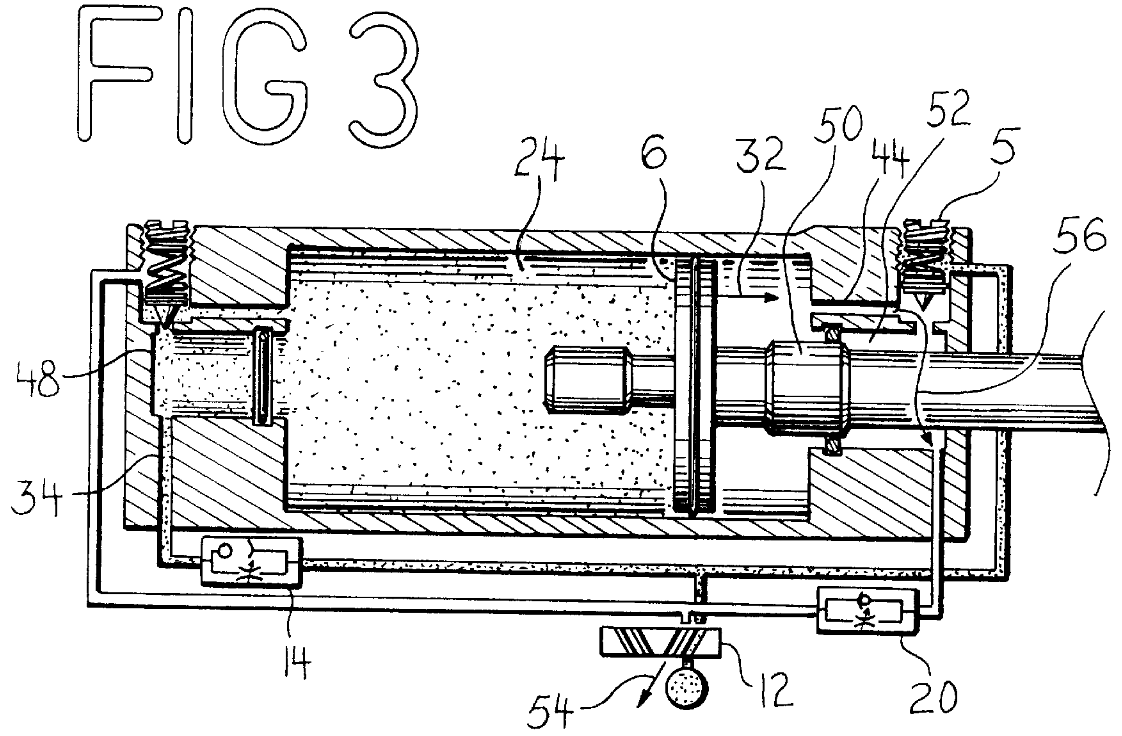
FIG. 3 is a side cross-sectional view of a fluid power actuator having a dynamic pressure regulator cushion at each cylinder end, with the piston at the beginning of the cushion part of the stroke.

FIG. 3 depicts piston 6 at the beginning of the cushion part of the stroke. Second spear 50 has entered second spear cavity 52, thus blocking the path of fluid in cylinder 8 ahead of piston 6 to second spear cavity 52 and second cylinder passage 36 to vent through second flow control valve 20. Pressure in cylinder 8 ahead of piston 6 increases rapidly, until the force it exerts on the lower surface of pressure sensor 62 through second cushion cylinder passage 44 is large enough to overcome the opposite force exerted on pressure sensor 62 by fluid at driving pressure 24 and spring 60. When the force exerted on the lower surface of pressure sensor 62 by fluid ahead of piston 6 exceeds the force exerted on pressure sensor 62 by fluid at driving pressure 24 and spring 60, valve 70 opens sufficiently to maintain the pressure of fluid in cylinder 8 ahead of piston 6 at a constant, pre-determined level above the driving pressure. This constant pressure differential across piston 6 results in a linear deceleration of piston 6 to near zero speed, and a low impact speed when piston 6 ends its stroke against second cylinder end 30. During the cushion stroke, fluid in cylinder 8escapes through second cushion cylinder passage 44, valve 70, second spear cavity 52 and second cylinder passage 36, as indicated by arrow 56.

Figure 4:
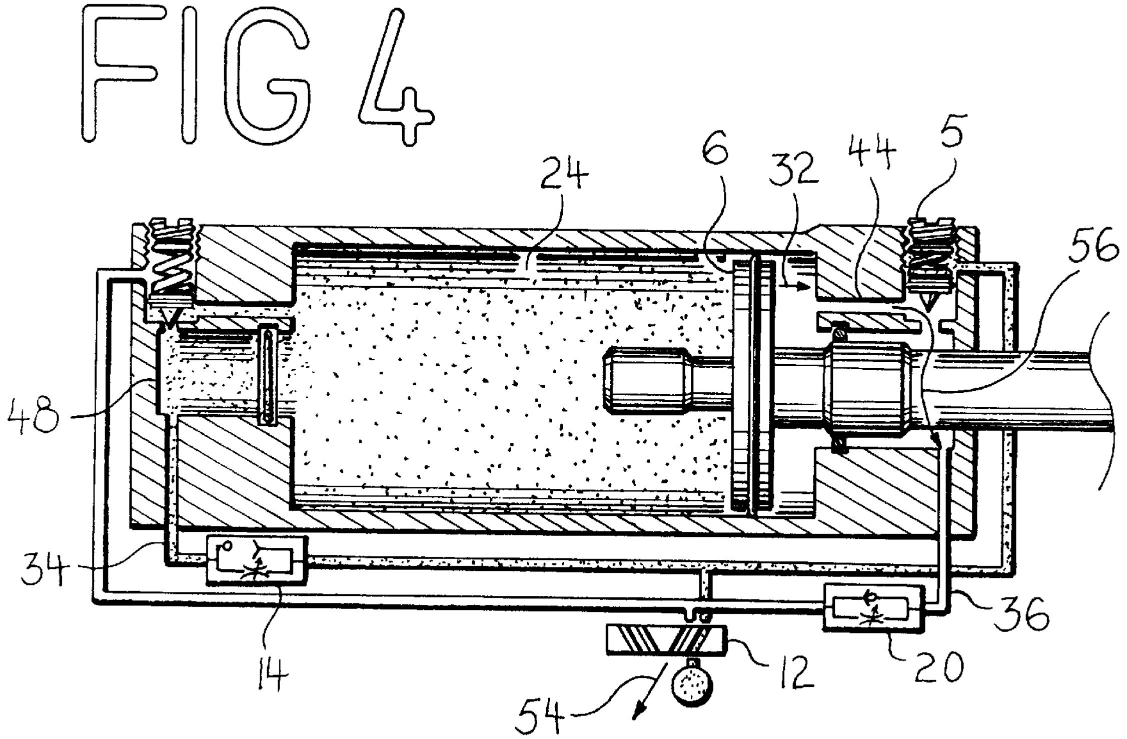
FIG. 4 is a side cross-sectional view of a fluid power actuator having a dynamic pressure regulator cushion at each cylinder end, with the piston approaching the beginning of the end-of-stroke pressure relief part of the stroke.

FIGS. 3 and 4 depict piston 6 progressing through the cushion part of the stroke. In both figures the cushion regulator valve 5 associated with second cylinder end 30 remains sufficiently open to maintain pressure ahead of piston 6 at a constant, pre-determined level above the pressure of the fluid driving piston 6. This constant, pre-determined level may be quickly and easily adjusted by tightening or loosening spring 60. The check valve 18 within first flow control valve 14 remains open to allow fluid at driving pressure 24 through first cylinder passage 34 and first spear cavity 48 into cylinder 8. The check valve 18 within second flow control valve 20 remains closed, and the metering valve 16 within second flow control valve 20 regulates fluid leaving cylinder 8 ahead of piston 6.

Figure 5:
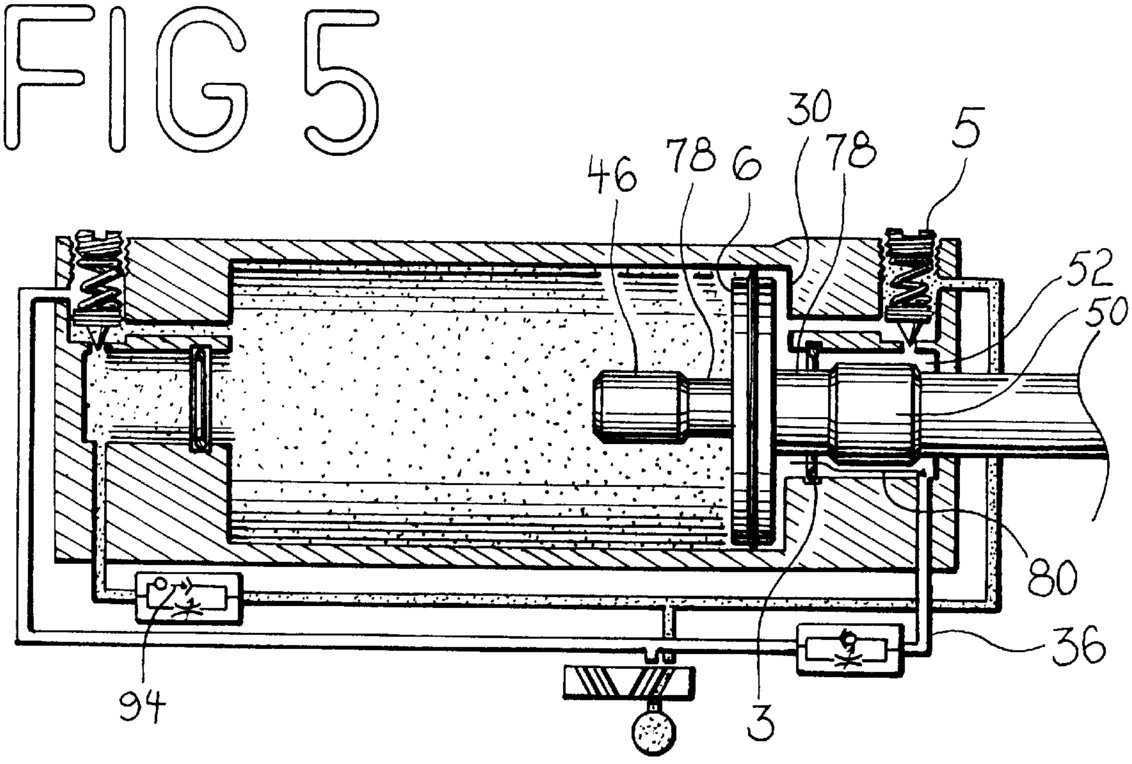
FIG. 5 is a side cross-sectional view of a fluid power actuator having a dynamic pressure regulator cushion at each cylinder end, with the piston against the second cylinder end.

FIG. 5 depicts piston 6 at the end of its stroke, resting against second cylinder end 30. Because piston 6 is at rest, and therefore not sending pressurized fluid to cushion regulator valve 5 through second cushion cylinder passage 44, valve 70 is closed. At the moment that piston 6 comes to a stop against second cylinder end 30, the check valve 18 in first flow control valve 14 closes, because the system is at rest: Pressure across the check valve 18 in first flow control valve 14 equalizes, and its light spring pre-loading closes it as indicated by arrow 94.

The drawings depict the valve within dynamic pressure regulator cushion 2 as a metering type valve, whose flow area is proportional to the sensor position. It is contemplated, however, that other valves may be used. For example, an alternate embodiment could incorporate a poppet valve. In this case, the variable restriction of cushion regulator valve 5 is produced by varying the position of poppet from the valve seat and/or high speed oscillation of the pressure sensing/metering component to vary the relative proportion of time that the valve is open or closed.

Figure 7:
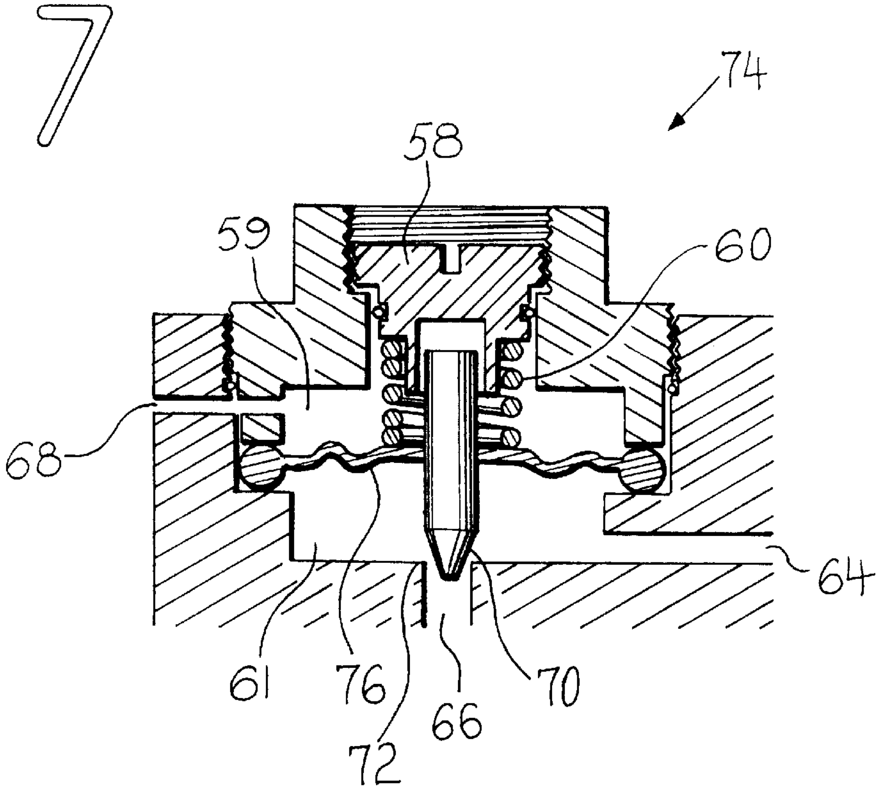
FIG. 7 is a cross-sectional view of a cushion diaphragm regulator valve.
Figure 8:
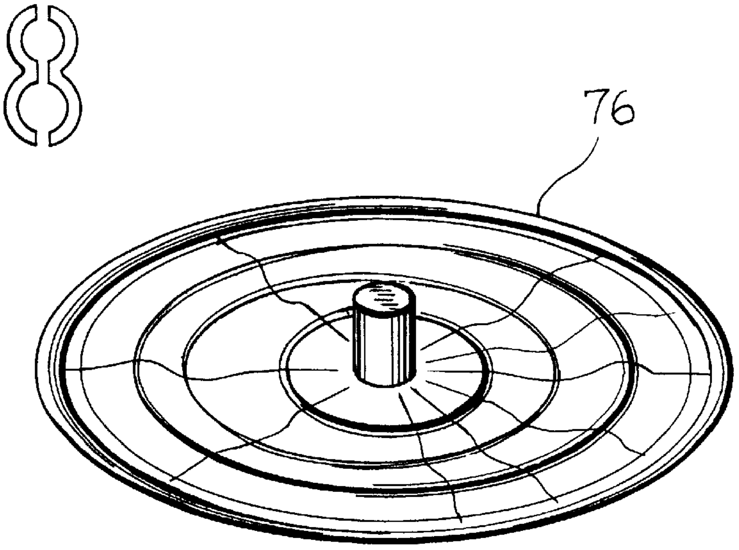
FIG. 8 is a front isometric view of a diaphragm.

FIGS. 7 and 8 depict an alternate pressure sensor, cushion diaphragm regulator valve 74. Cushion diaphragm regulator valve 74 incorporates diaphragm 76 as a pressure sensor, and valve 70 is attached to diaphragm 76. Cushion diaphragm regulator valve 74 functions same as cushion regulator valve 5. It is contemplated to be within the scope of the instant invention that pressure sensor 62 be any presently available pressure sensor, including but not limited to a pressure sensor piston, single convolution diaphragm, welded or formed bellows, etc.

Figure 10:
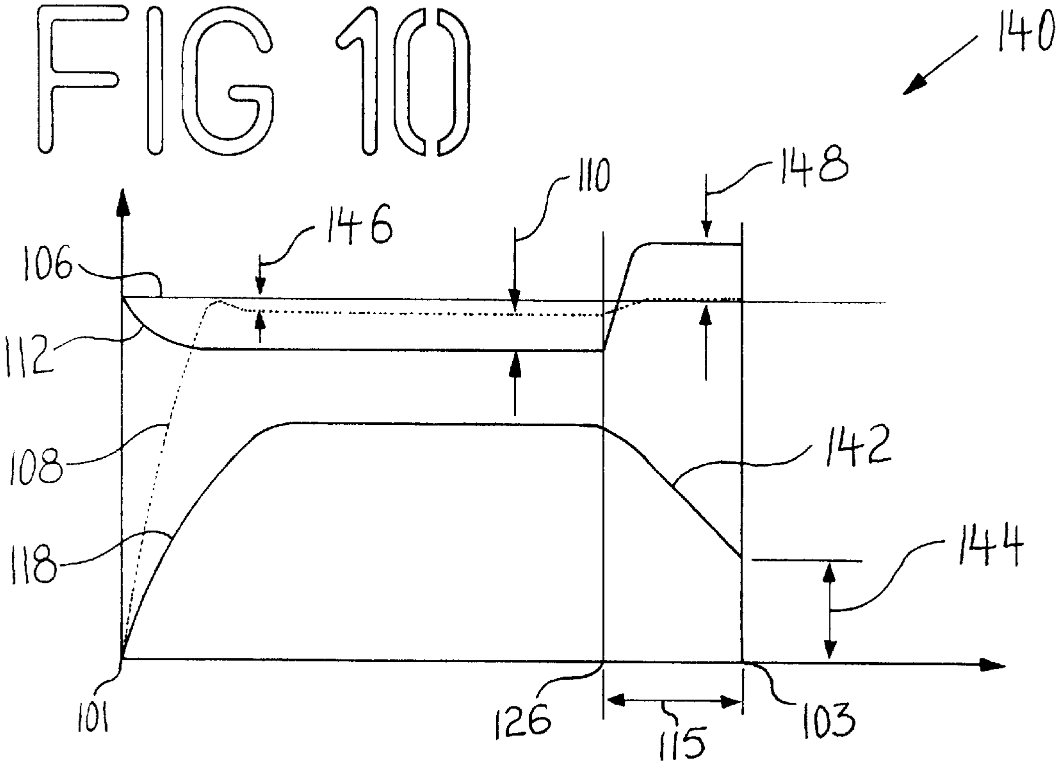
FIG. 10 is a dynamic pressure regulator cushion pressure/piston speed vs. stroke graph.

FIG. 10 graphically depicts the stroke just described, shown in FIGS. 1–5. From stroke start 101 driving pressure 108 (depicted by a dotted line) largely remains slightly below supply pressure 106 due to inlet loss 146. Throughout most of the stroke, until cushion start 126, fluid pressure ahead of piston 112 remains below driving pressure 108 due to normal operating speed friction 110. Piston speed 118 starts out at zero at stroke start 101, then climbs to equilibrium for most of the stroke until cushion stroke 115 starts at cushion start 126.

Between cushion start 126 and stroke end 103, cushion regulator valve 5 opens sufficiently to maintain fluid pressure ahead of piston 112 above driving pressure 108 by differential pressure 148. This differential pressure 148 linearly decelerates piston 6 as depicted by linear deceleration 142 to a low impact speed 144 at stroke end 103.

Figure 9:
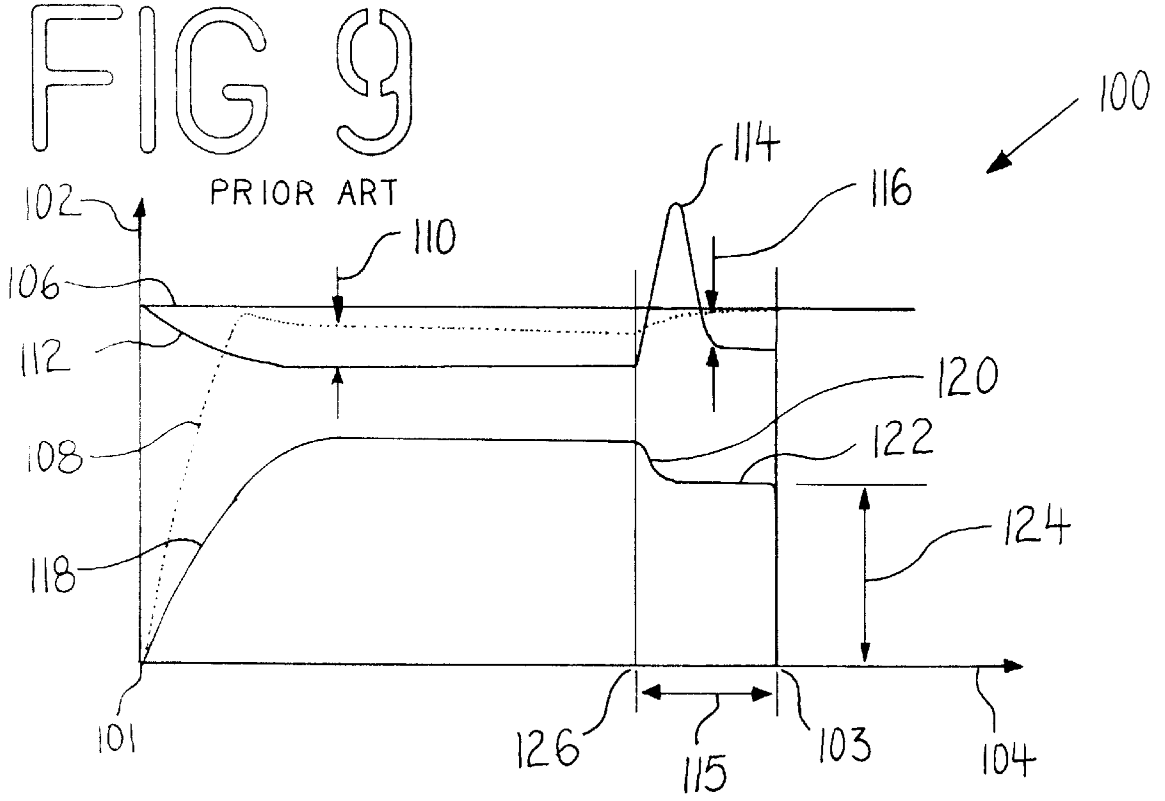
FIG. 9 is a conventional cushion pressure/piston speed vs. stroke graph.

The dynamic pressure regulator cushion pressure/piston speed vs. stroke graph 140 of FIG. 10 may be easily contrasted to the conventional cushion pressure/piston speed vs. stroke graph 100 of FIG. 9. Of special interest in FIG. 9 (conventional cushion) are pressure spike 114, excessive deceleration 120 and high impact speed 124. In stark contrast, the instant invention dynamic pressure regulator cushion 2 provides a constant, predetermined differential pressure 148, no pressure spike, and smooth, linear deceleration 142, which results in low impact speed 144.

End-of Stroke Pressure Relief

It is advisable to relieve the pressure remaining in cylinder 8 ahead of piston 6 at end of stroke, in order for fluid power actuator 4 to produce full holding force to keep the load firmly stationary. There are four embodiments of end-of-stroke pressure relief systems taught in the instant disclosure.

The first end-of-stroke pressure relief system is depicted in FIGS. 1–5, and shown in action in FIG. 5. First spear 46 and second spear 50 each incorporate a spear cross-section reduction 78 adjacent piston 6. As depicted in FIG. 5, at stroke end, spear cross-section reduction 78 provides a leak path between the seal 3 of second spear cavity 52 and second spear 50. This leak path permits fluid in cylinder 8 ahead of piston 6 to escape between the seal 3 of second spear cavity 52 and second spear 50 into second cylinder passage 36, as indicated by arrow 80.

Figure 11:
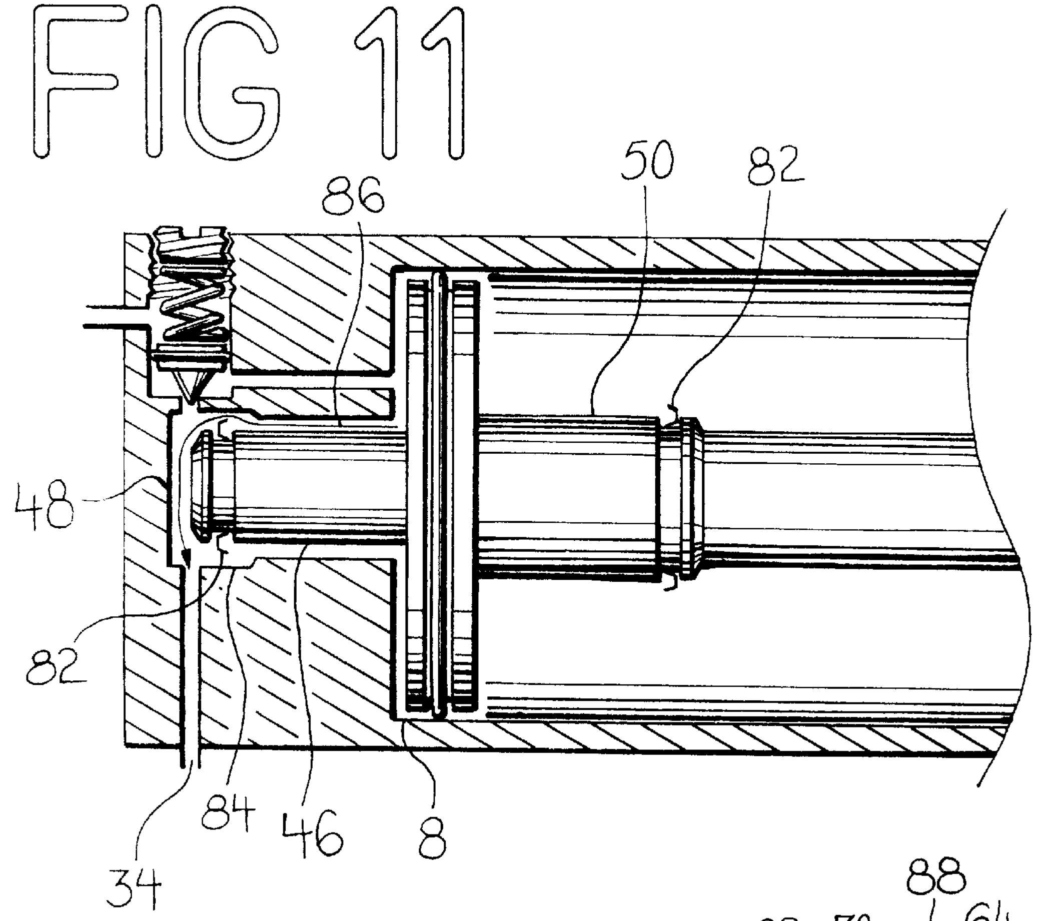
FIG. 11 is a side cross-sectional view of a first alternate embodiment end-of-stroke pressure relief system.

FIG. 11 is a side cross-sectional view of a first alternate embodiment end-of-stroke pressure relief system. Here, first spear 46 and second spear 50 each incorporate a pressure-energized one-way seal 82 at an extreme opposite piston 6. Each spear cavity incorporates a spear cavity cross-section increase 84 at an extreme opposite cylinder 8. When piston 6 reaches end-of-stroke, the clearance between pressure-energized one-way seal 82 and spear cavity cross-section increase 84 provides a leak path permitting fluid in cylinder 8 ahead of piston 6 to escape into first cylinder passage 34, as indicated by arrow 86.

Figure 12:
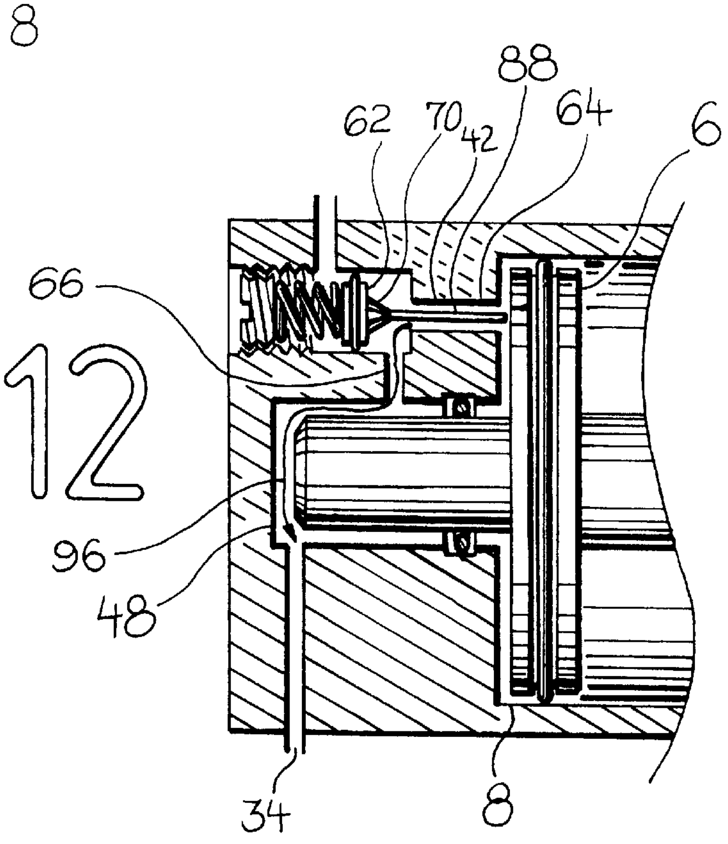
FIG. 12 is a side cross-sectional view of a second alternate embodiment end-of-stroke pressure relief system.

FIG. 12 is a side cross-sectional view of a second alternate embodiment end-of-stroke pressure relief system. Here, valve probe 88 is attached to an extreme of valve 70 opposite pressure sensor 62. Valve probe 88 extends into cylinder 8 through first cushion cylinder passage 42 far enough so that when piston 6 is at end-of-stroke, piston 6 pushes valve probe 88 sufficiently to unseat valve 70. Under these conditions, an escape path is provided fluid in cylinder 8 ahead of piston 6 through first cushion cylinder passage 42, valve 70, cushion spear passage 66 and first spear cavity 48, into first cylinder passage 34, as indicated by arrow 96.

FIG. 12 depicts only one variation of this second alternate embodiment end-of-stroke pressure relief system. Valve probe 88 needn't be attached to valve 70. It is only required that valve probe 88 actuate valve 70 at stroke end. Thus, it is contemplated to be within the sphere of this invention that valve probe 88 may be a pushrod type probe as illustrated, a cam, a bellcrank, or any other appropriate shape. In addition, valve probe 88 may be moved at stroke end by piston 6, by a spear 46 or 52, by output shaft 10, or any other appropriate part within fluid power actuator 4, or any other appropriate element driven by fluid power actuator 4. For the purposes of the instant invention, it suffices that valve probe 88 be moved at stroke end by some component of (or a component driven by) fluid power actuator 4, and that valve probe 88 in turn open valve 70 to relieve pressure at stroke end.

Figure 13:
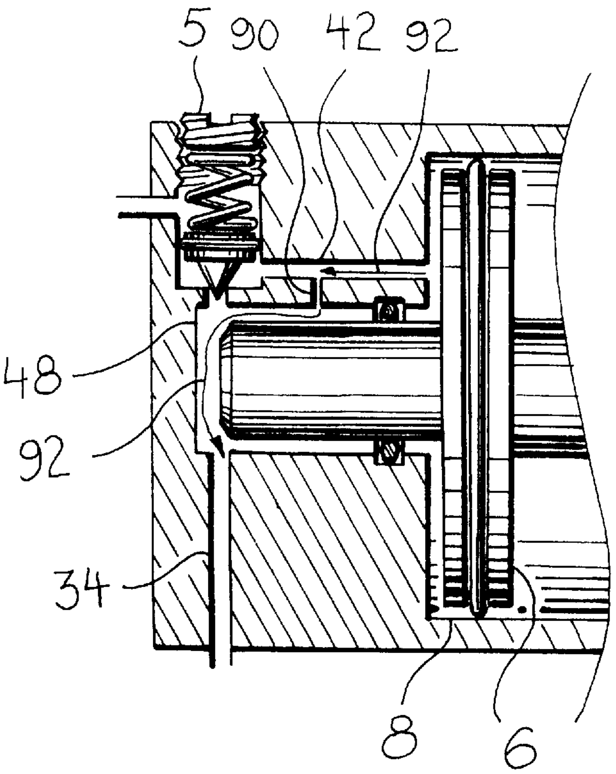
FIG. 13 is a side cross-sectional view of a third alternate embodiment end-of-stroke pressure relief system.

FIG. 13 is a side cross-sectional view of a third alternate embodiment end-of-stroke pressure relief system. This embodiment incorporates cylinder relief passage 90 between first cushion cylinder passage 42 and first spear cavity 48. Cylinder relief passage 90 is in effect a small leak path in parallel with cushion regulator valve 5, and permits fluid in cylinder 8 ahead of piston 6 to exit cylinder 8 through first cushion cylinder passage 42, cylinder relief passage 90, and first spear cavity 48 to first cylinder passage 34, as indicated by arrows 92.

Because the volume of fluid remaining in cylinder 8 ahead of piston 6 is small near the end of stroke, cylinder relief passage 90 may be of very small cross-sectional area, so that it will have a minimal impact on the operation of dynamic pressure regulator cushion 2. This third embodiment end-of-travel pressure relief system is particularly useful for applications which involve large friction or other retarding forces and low momentum.

While a preferred embodiment of the invention has been illustrated herein, it is to be understood that changes and variations may be made by those skilled in the art without departing from the spirit of the appending claims.

Drawing Item Index

| | |
|---|---|
| 2 | dynamic pressure regulator cushion |
| 3 | seal |
| 4 | fluid power actuator |
| 5 | cushion regulator valve |
| 6 | piston |
| 8 | cylinder |
| 10 | outputshaft |
| 12 | directional control valve |
| 14 | first flow control valve |
| 16 | metering valve |
| 18 | check valve |
| 20 | second flow control valve |
| 22 | pressure supply |
| 24 | fluid at driving pressure |
| 26 | arrow |
| 28 | first cylinder end |
| 30 | second cylinder end |
| 32 | arrow |
| 34 | first cylinder passage |
| 36 | second cylinder passage |
| 38 | first cushion driving pressure passage |
| 40 | second cushion driving pressure passage |
| 42 | first cushion cylinder passage |
| 44 | second cushion cylinder passage |

-continued

| | |
|---|---|
| 46 | first spear |
| 48 | first spear cavity |
| 50 | second spear |
| 52 | second spear cavity |
| 54 | arrow |
| 56 | arrow |
| 57 | plenum |
| 58 | screw |
| 59 | upper plenum |
| 60 | spring |
| 61 | lower plenum |
| 62 | pressure sensor |
| 64 | cushion cylinder passage |
| 66 | cushion spear passage |
| 68 | cushion driving pressure passage |
| 70 | valve |
| 72 | valve seat |
| 74 | cushion diaphragm regulator valve |
| 76 | diaphragm |
| 78 | spear cross-section reduction |
| 80 | arrow |
| 82 | pressure-energized one-way seal |
| 84 | spear cavity cross-section increase |
| 86 | arrow |
| 88 | valve probe |
| 90 | cylinder relief passage |
| 92 | arrow |
| 94 | arrow |
| 96 | arrow |
| 100 | conventional cushion pressure/piston speed vs. stroke graph |
| 101 | stroke start |
| 102 | ordinate axis |
| 103 | stroke end |
| 104 | abscissa axis |
| 106 | supply pressure |
| 108 | driving pressure |
| 110 | normal operating speed friction |
| 112 | fluid pressure ahead of piston |
| 114 | pressurespike |
| 115 | cushion stroke |
| 116 | cushion stroke friction |
| 118 | piston speed |
| 120 | excessive deceleration |
| 122 | cushion piston speed |
| 124 | high impact speed |
| 126 | cushion start |
| 140 | dynamic pressure regulator cushion pressure/piston speed vs stroke graph |
| 142 | linear deceleration |
| 144 | low impact speed |
| 146 | inlet loss |
| 148 | differential pressure |

I claim:

1. A dynamic pressure regulator cushion for use with a fluid power actuator, said fluid power actuator comprising a piston disposed within a cylinder, said dynamic pressure regulator cushion comprising a pressure sensor attached to a valve, an upper surface of said pressure sensor being exposed to fluid at driving pressure which tends to close said valve, a lower surface of said pressure sensor being exposed to fluid pressure ahead of said piston which tends to open said valve, means to adjust a differential pressure at which said valve opens, fluid ahead of said piston communicating with an exterior of said cylinder through said valve, whereby during a cushion part of a piston stroke fluid presure in said cylinder ahead of said piston is maintained at a constant, pre-determined level above driving pressure, resulting in smooth linear piston deceleration to near zero at end of stroke.

2. The dynamic pressure regulator cushion of claim 1 wherein said fluid power actuator further comprises a cylinder passage communicating with said cylinder whereby fluid ahead of said piston may exit said cylinder, and said dynamic pressure regulator cushion further comprises means to block said cylinder passage at a start of said cushion part of a piston stroke, whereby a sole exit for fluid in said cylinder ahead of said piston is through said valve.

3. The dynamic pressure regulator cushion of claim 2 further comprising means to relieve fluid pressure in said cylinder ahead of said piston at end of stroke.

4.The dynamic pressure regulator cushion of claim 3 wherein said means to relieve fluid pressure in said cylinder ahead of said piston at end of stroke comprises a spear cavity communicating with said cylinder, a spear attached to said piston sized to mate with said spear cavity, sealing means at an end of said spear cavity adjacent said cylinder, and a spear cross-section reduction between said spear and said piston, whereby at end of stroke fluid in said cylinder ahead of said piston may escape said cylinder between said spear cross-section reduction and said spear cavity sealing means.

5. The dynamic pressure regulator cushion of claim 3 wherein said means to relieve fluid pressure in said cylinder ahead of said piston at end of stroke comprises a spear cavity communicating with said cylinder, a spear attached to said piston sized to mate with said spear cavity, a pressure-energized one-way seal at an extreme of said spear opposite said piston, and a spear cavity cross-section increase at an end of said spear cavity opposite said cylinder, whereby at end of stroke fluid in said cylinder ahead of said piston may escape said cylinder between said pressure-energized one-way and said spear cavity cross-section increase.

6. The dynamic pressure regulator cushion of claim 3 wherein said means to relieve fluid pressure in said cylinder ahead of said piston at end of stroke comprises a valve probe actuated at end of stroke by said piston, by a spear attached to said piston, or by an output shaft driven by said piston, actuation of said valve probe opening said valve, thereby allowing fluid in said cylinder ahead of said piston to escape said cylinder through said valve.

7. The dynamic pressure regulator cushion of claim 3 wherein said means to relieve fluid pressure in said cylinder ahead of said piston at end of stroke comprises a cylinder relief passage in parallel to said valve, whereby at end of stroke fluid in said cylinder ahead of said piston may escape said cylinder through said cylinder relief passage.

8. The dynamic pressure regulator cushion of claim 2 wherein said upper surface of said pressure sensor has a same surface area as said lower surface of said pressure sensor.

9. The dynamic pressure regulator cushion of claim 2 wherein said pressure sensor is a pressure sensor piston reciprocating within a plenum, said pressure sensor piston dividing said plenum into an upper plenum and a lower plenum, said upper plenum containing fluid at driving pressure, said lower plenum communicating with said cylinder ahead of said piston and with said cylinder passage.

10. The dynamic pressure regulator cushion of claim 9 wherein said means to adjust a differential pressure at which said valve opens comprises a spring disposed within said upper plenum pre-loaded to maintain said valve closed, and means to adjust a force of said spring pre-loading.

11.The dynamic pressure regulator cushion of claim 10 wherein said means to adjust a force of said spring pre-loading comprises a screw in contact with said spring, whereby tightening said screw increases the spring pre-loading, and loosening said screw decreases the spring pre-loading.

12. The dynamic pressure regulator cushion of claim 2 wherein said pressure sensor is a diaphragm within a plenum, an outer edge of said diaphragm being attached to and sealed to an inside wall of said plenum, said diaphragm dividing said plenum into an upper plenum and a lower plenum, said upper plenum containing fluid at driving pressure, said lower plenum communicating with said cylinder ahead of said piston and with said cylinder passage.

13. The dynamic pressure regulator cushion of claim 12 wherein said means to adjust a differential pressure at which said valve opens comprises a spring disposed within said upper plenum pre-loaded to maintain said valve closed, and means to adjust a force of said spring pre-loading.

14. The dynamic pressure regulator cushion of claim 13 wherein said means to adjust a force of said spring pre-loading comprises a screw in contact with said spring, whereby tightening said screw increases the spring pre-loading, and loosening said screw decreases the spring pre-loading.

15. The dynamic pressure regulator cushion of claim 2 wherein said valve is a regulating valve.

16. The dynamic pressure regulator cushion of claim 2 wherein said valve is a poppet valve.

17. A dynamic pressure regulator cushion for use with a fluid power actuator, said fluid power actuator comprising a piston disposed within a cylinder, a part of said cylinder ahead of said piston communicating with an exterior of said cylinder through a cylinder passage, and means to block said cylinder passage at the start of a cushion part of a piston stroke, said dynamic pressure regulator cushion comprising a pressure sensor attached to a valve, a surface of said pressure sensor tending to close said valve being exposed to fluid at driving pressure, a surface of said pressure sensor tending to open said valve being exposed to fluid pressure in said cylinder ahead of said piston, and means to adjust a differential pressure at which said valve opens, whereby after said start of a cushion part of a piston stroke a sole exit for fluid in said cylinder ahead of said piston is through said valve.

18. The dynamic pressure regulator cushion of claim 17 wherein said pressure sensor is a pressure sensor piston reciprocating within a plenum, said pressure sensor piston dividing said plenum into an upper plenum and a lower plenum, said upper plenum containing fluid at driving pressure, said lower plenum communicating with said cylinder ahead of said piston and with said cylinder passage.

19. The dynamic pressure regulator cushion of claim 17 wherein said pressure sensor is a diaphragm within a plenum, an outer edge of said diaphragm being attached to and sealed to an inside wall of said plenum, said diaphragm dividing said plenum into an upper plenum and a lower plenum, said upper plenum containing fluid at driving pressure, said lower plenum communicating with said cylinder ahead of said piston and with said cylinder passage.

20. The dynamic pressure regulator cushion of claim 6 wherein said valve probe extends into said cylinder or into a spear cavity, and movement of said valve probe as urged by said piston or by said spear opens said valve, whereby at end of stroke said piston or said spear touches and moves said valve probe to open said valve, thereby allowing fluid in said cylinder ahead of said piston to escape said cylinder through said valve.

* * * * *